(12) United States Patent
Hyodo et al.

(10) Patent No.: US 8,137,238 B2
(45) Date of Patent: Mar. 20, 2012

(54) GEARSHIFT CONTROLLER FOR INDUSTRIAL VEHICLE

(75) Inventors: Koji Hyodo, Tsuchiura (JP); Tetsuji Tanaka, Abiko (JP); Eiichi Sakai, Ryugasaki (JP); Genichiro Ishimaru, Inashiki (JP); Tomoo Takahashi, Tsuchiura (JP); Yasuo Yamazaki, Inashiki-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 427 days.

(21) Appl. No.: 12/516,465

(22) PCT Filed: Nov. 30, 2007

(86) PCT No.: PCT/JP2007/073219
§ 371 (c)(1),
(2), (4) Date: May 27, 2009

(87) PCT Pub. No.: WO2008/066169
PCT Pub. Date: Jun. 5, 2008

(65) Prior Publication Data
US 2010/0069199 A1    Mar. 18, 2010

(30) Foreign Application Priority Data
Nov. 30, 2006   (JP) .................................. 2006-323029

(51) Int. Cl.
*F16H 61/48*    (2006.01)
*F16H 61/40*    (2006.01)
*B60W 10/00*   (2006.01)
*B60K 17/28*   (2006.01)

(52) U.S. Cl. .............. 477/61; 477/69; 477/86; 180/53.1

(58) Field of Classification Search ..................... 477/61, 477/69, 86, 115; 701/52; 180/53.1; 192/3.54, 192/3.57, 3.59, 3.63
See application file for complete search history.

(56) References Cited

U.S. PATENT DOCUMENTS
3,713,351 A * 1/1973 Sakakibara et al. ............ 477/61
(Continued)

FOREIGN PATENT DOCUMENTS
JP         63-151315 U    10/1988
(Continued)

OTHER PUBLICATIONS
International Search Report dated Feb. 5, 2008 (two (2) pages).

*Primary Examiner* — Roger Pang
(74) *Attorney, Agent, or Firm* — Crowell & Moring LLP (57) ABSTRACT

A gearshift controller for an industrial vehicle, includes: a speed ratio detection unit that detects a speed ratio of speeds of an input axis and of an output axis of a torque converter; a gearshift control unit that shifts up a speed stage when the detected speed ratio is equal to or more than a first predetermined value and shifts down the speed stage when the detected speed ratio is equal to or less than a second predetermined value, which is smaller than the first predetermined value; and an operation member with which a downshift to the first speed is instructed by operation thereof by an operator. When the downshift is instructed by the operation member, the gearshift control unit controls the speed stage to be kept at the first speed for a predetermined time period regardless of the speed ratio detected by the speed ratio detection unit.

6 Claims, 8 Drawing Sheets

U.S. PATENT DOCUMENTS

| | | | |
|---|---|---|---|
| 3,765,271 A * | 10/1973 | Dach et al. | 477/61 |
| 3,874,254 A * | 4/1975 | Ahlen | 477/60 |
| 4,730,520 A * | 3/1988 | Nishikawa et al. | 477/61 |
| 4,977,797 A * | 12/1990 | Aoki et al. | 477/129 |
| 5,050,456 A | 9/1991 | Fukuda | |
| 6,609,056 B1 * | 8/2003 | Czarnecki et al. | 701/51 |

FOREIGN PATENT DOCUMENTS

| | | |
|---|---|---|
| JP | 1-114324 U | 8/1989 |
| JP | 2-134454 A | 5/1990 |
| JP | 6-34029 A | 2/1994 |
| JP | 11-257485 A | 9/1999 |
| JP | 3388594 B2 | 1/2003 |

* cited by examiner

GEARSHIFT CONTROLLER FOR INDUSTRIAL VEHICLE

TECHNICAL FIELD

The present invention relates to a gearshift controller for an industrial vehicle such as a wheel loader.

BACKGROUND ART

A device is known so far which is constructed such that the output torque of the engine is transmitted to the transmission through the torque converter (hereafter, "tor-con") (for instance, refer to Patent Document 1). The device described in this Patent Document 1 calculates a speed ratio, which is a ratio of rotational speeds on an input axis side and an output axis side of the tor-con, and performs an upshift or a downshift of the speed stage, when the ratio of the rotational speeds reaches a predetermined value set beforehand.
[Patent Document 1] Japanese Patent No. 3388594

SUMMARY OF THE INVENTION

Problem to be Solved by the Invention

When excavation work is done by causing a wheel loader to dart at a pile of earth and sand, big driving force is needed. However, the device described in the above-mentioned patent document 1 automatically shifts up when the speed ratio of the tor-con is large. Therefore, even when it is tried to cause the wheel loader to dart at the earth and sand at, for instance, the 1st speed, there occurs an upshift to the 2nd speed immediately before the wheel loader reaches there, so that an enough driving force was not occasionally obtained upon the excavation work.

Means for Solving the Problem

The gearshift controller for an industrial vehicle according to the present invention includes: a speed ratio detection unit that detects speed ratios of an input axis and of an output axis of a tor-con; a gearshift control unit that shifts up a speed stage when the detected speed ratio is equal to or more than a first predetermined value and shifts down the speed stage when the detected speed ratio is equal to or less than a second predetermined value, which is smaller than the first predetermined value; and an operation member with which a downshift to the first speed is instructed by operation thereof by an operator. When the downshift is instructed by the operation member, the gearshift control unit controls the speed stage to be kept at the first speed for a predetermined time period regardless of the speed ratio detected by the speed ratio detection unit.

It is preferred that the gearshift control unit allows switching to the first speed by operation of the operation member while the vehicle is traveling at a second speed and prohibits the switching to the first speed by operation of the operation member while the vehicle is traveling at a 3rd or higher speed. When the downshift is not instructed with the operation member, the gearshift control unit controls a minimum speed stage while the vehicle is traveling to be kept at the second speed.

The above-mentioned gearshift controller may include a speed stage setting unit that sets a maximum speed stage of the transmission with operation by the operator and limits the speed stage equal to or lower than the set maximum speed stage upon the upshift.

It is preferred that the operation member is disposed to an operation member for working that operates an actuator for working or in the vicinity thereof.

The gearshift controller for an industrial vehicle according to the present invention includes a rotational speed detection unit that detects respective rotational speeds of an input axis and an output axis of a tor-con; a solenoid control unit that drives a solenoid for gearshift of a transmission; a gearshift control unit having an input unit that inputs signals detected by the rotational speed detection unit and a calculation unit that calculates a speed ratio of rotational speeds of the input axis and the output axis based on the signals input by the input unit, the gearshift control unit shifting up a speed stage when the calculated ratio of speeds is equal to or more than a first predetermined value and shifting down the speed stage when the calculated ratio of speeds is equal to or less than a second predetermined value, which is smaller than the first predetermined value; and an operation member with which a downshift to the first speed is instructed by operation thereof by an operator. The gearshift control unit further includes a memory unit in which there is set a predetermined time period longer than a standard time period required for the vehicle to thrust into earth and sand after a downshift of the speed stage to the first stage upon excavation; and an output unit that outputs a control signal to the solenoid control unit so as to control the speed stage to be maintained at the first speed for the predetermined time period regardless of the calculated ratio of speeds when the downshift of the speed stage to the first speed is instructed with the operation member.

It is preferred that the above-mentioned gearshift controller is applied to an industrial vehicle that includes four tires; a body supported by the tires and provided articulately; a front side frame and a rear side frame each constituting the body; a cab provided in front of the rear side frame; an engine compartment provided in rear of the rear side frame; an arm provided rotatably in a vertical direction with respect to the front side frame; and a bucket provided rotatably at a top of the arm.

Advantageous Effect of the Invention

Since the gearshift controller for an industrial vehicle according to the present invention is configured such that the speed stage is controlled to be kept at the first speed for a predetermined time period when a downshift is instructed through the operation member, no undesirable upshift occurs when gearshift control is performed in response to a tor-con speed ratio, so that an enough driving force can be obtained upon working.

BEST MODE FOR CARRYING OUT THE INVENTION

Figure 1:
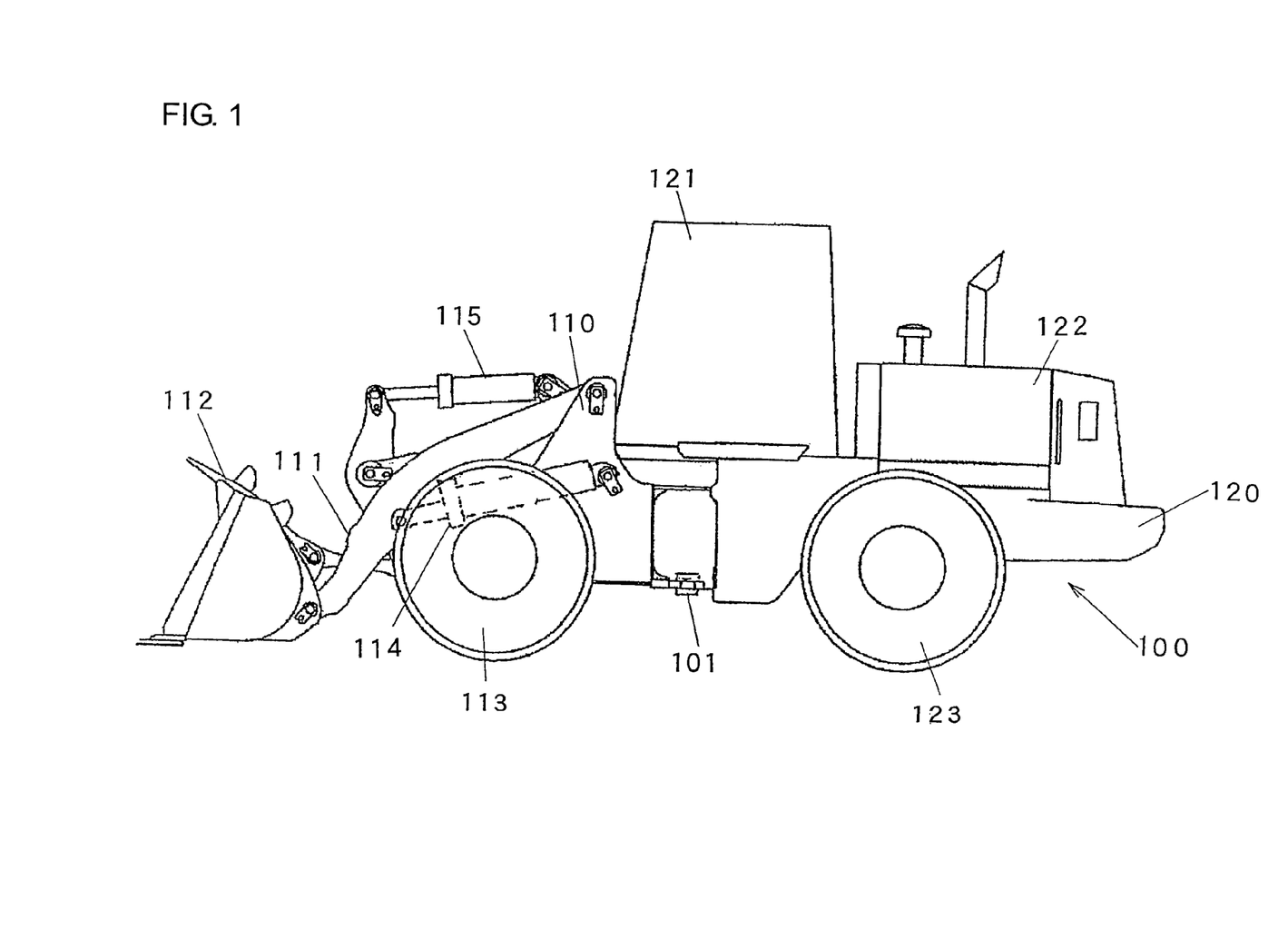
FIG. 1 is a side elevation of a wheel loader according to an embodiment of the present invention.

The following is an explanation of a gearshift controller according to an embodiment of the present invention given in reference to FIGS. 1 through 8. FIG. 1 is a side elevation of a wheel loader that is an example of an industrial vehicle to which the gearshift controller according to the present embodiment is applied. A wheel loader 100 is constituted by a front body 110 possessing an arm 111, a bucket 112, and tires 113, etc., and a rear body 120 possessing a cab 121, an engine compartment 122, and tires 123, etc. The arm 111 turns in the vertical direction (faces upward and downward) as driven by a driving arm cylinder 114. The bucket 112 turns in the vertical direction (dumps or crowds) as driven by a bucket cylinder 115. The front body 110 and the rear body 120 are mutually linked by a center pin 101 to be articulated, and the front body 110 is deflected with respect to the rear body 120 rightward and leftward by the extension and retraction of a steering wheel cylinder (not shown).

Figure 2:
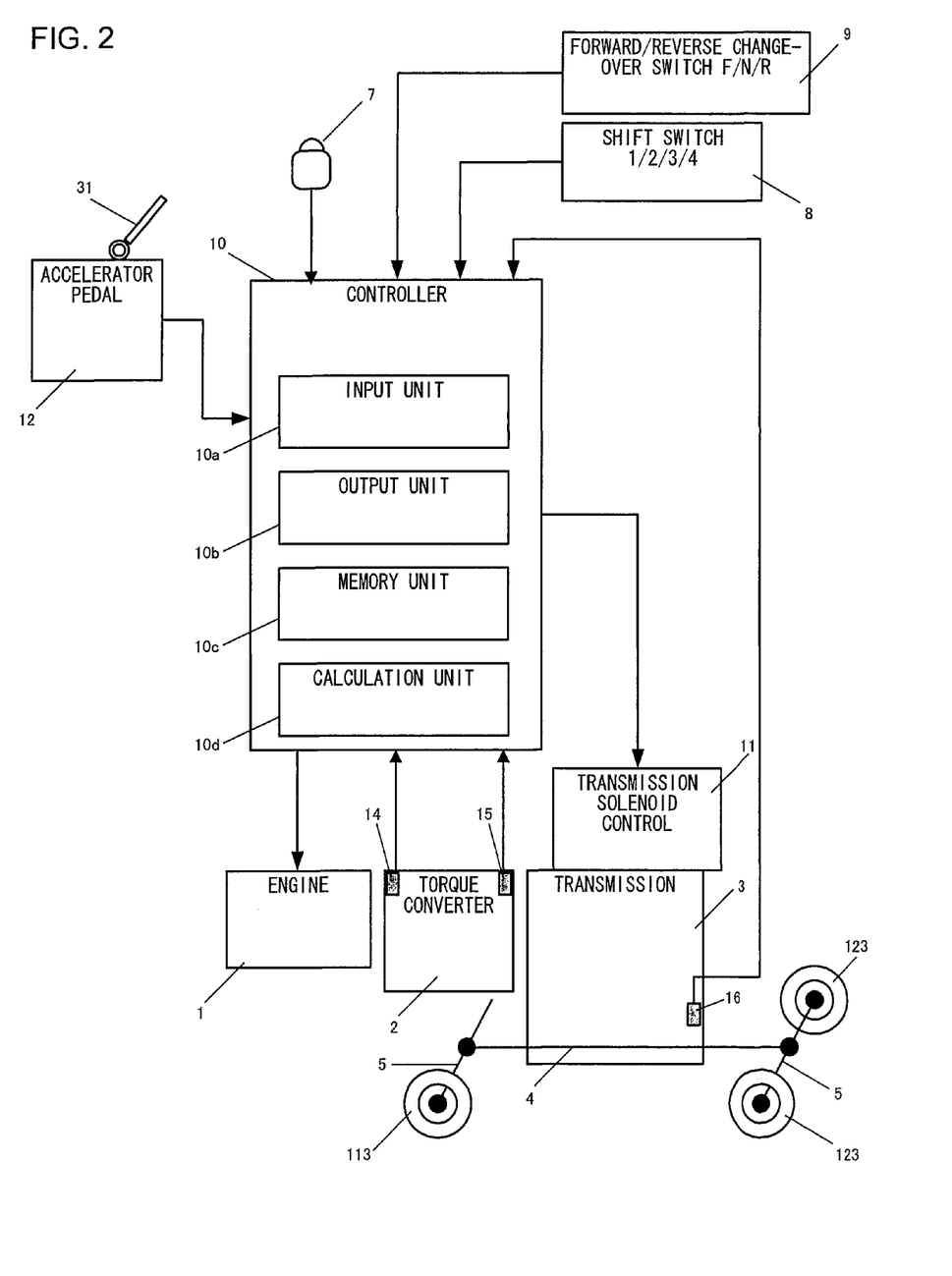
FIG. 2 is a schematic configuration diagram showing a gearshift controller according to an embodiment of the present invention.

FIG. 2 is a schematic configuration diagram showing the gearshift controller according to the present embodiment. An input axis of a tor-con 2 is linked to an output axis of an engine 1, and the output axis of the tor-con 2 is linked to a transmission 3. The tor-con 2 is a liquid clutch that includes an impeller, a turbine, and a stator, which are well-known. The rotation of the engine 1 is transmitted to the transmission 3 through the tor-con 2. The transmission 3 has a hydraulic pressure clutch that can shift gears to 1st to 4th speeds, and the rotation of the output axis of the tor-con 2 is changed by the transmission 3. The changed rotation is transmitted to the tires 113, 123 through a propeller shaft 4 and an axle 5 to drive the vehicle.

Figure 3:
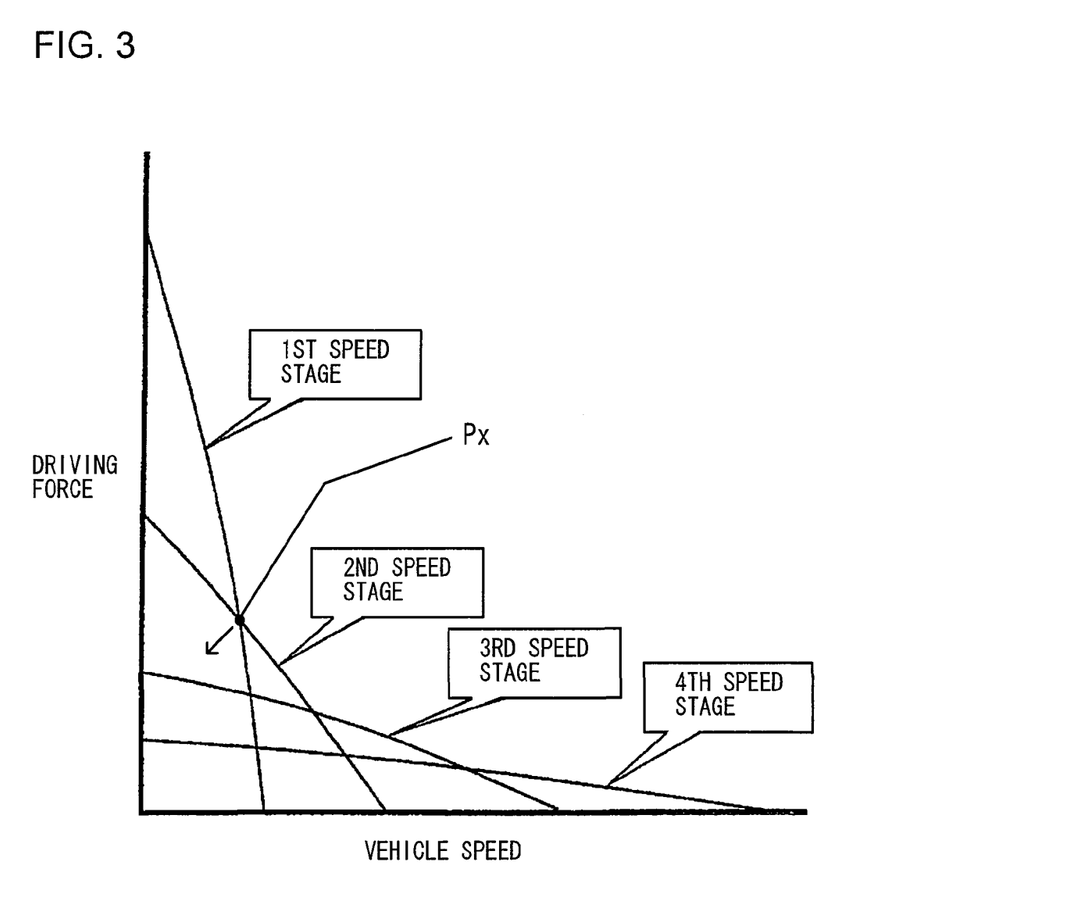
FIG. 3 is diagram illustrating the relationship between each speed stage and each driving force.

The tor-con 2 has a function to increase the output torque relative to the input torque, that is, to increase a torque ratio to 1 or more. The torque ratio becomes smaller as a speed ratio "e" of the tor-con, which is a ratio of the rotational speeds of the input axis and of the output axis of the tor-con 2, increases. For instance, the rotational speed of the output axis of the tor-con 2, that is, a vehicle speed decreases and the speed ratio "e" becomes small when the traveling load grows during traveling in a state in which the engine rotational speed is constant. On this occasion, the torque ratio increases, so that it becomes possible for the vehicle to travel with a bigger driving force (traction). The relationship between the vehicle speed and the driving force for each of the speed stages is as shown in FIG. 3. Assuming that comparison is made in the same speed stages, the driving force is larger at a lower speed of the vehicle (low-speed-high-torque), and is smaller at a faster speed of the vehicle (high-speed-low-torque). Moreover, a bigger driving force can be obtained in a smaller number of speed stages.

The transmission 3 is an automatic transmission that has solenoid-operated valves corresponding to respective speed stages (i.e. solenoid-operated valves for the 1st to the 4th speeds). These solenoid-operated valves are driven in response to a control signal output from a controller 10 to a solenoid control unit 11. That is, when the control signal is output by the controller 10, the solenoid control unit 11 outputs a control signal to the solenoid-operated valve according to the control signal from the controller 10 to drive the solenoid-operated valve. As a result, the speed stages are automatically changed among the 1st to the 4th speeds from one to another.

There are two methods for automatic gearshift control, i.e. a tor-con speed ratio-based control that changes gears when the speed ratio "e" of the tor-con reaches a predetermined value and a vehicle speed-based control that changes the gear when the speed of the vehicle reaches a predetermined value. In the present embodiment, the speed stages are controlled as detailed later by the tor-con speed ratio-based control. According to the tor-con speed ratio-based control, an upshift occurs if the load is light even when the vehicle speed is low. Therefore, timing of the upshift becomes earlier, and the tor-con speed ratio-based control excels in the point of fuel consumption and the noise compared with the speed ratio-based control.

On the other hand, the tor-con speed ratio-based control might occasionally result in an upshift to the 2nd speed against the mind of the operator who tries to start the work in the state of the 1st speed. For instance, even if it is tried to set the vehicle in the state of the 1st speed so as to allow it to rush to piled earth and sand, etc., there occurs an upshift to the 2nd speed quickly. As a result, the vehicle is prevented from thrusting into the earth and sand, etc., in the state of the 1st speed since the load is low before the vehicle rushes thereto. Accordingly, it is not possible to obtain an enough force upon the working. Then, the gearshift controller according to the present embodiment is constructed as follows.

There are connected to the controller 10 an operation amount detector 12 that detects an amount of operation of an accelerator pedal 31, a rotational speed detector 14 that detects a rotational speed Ni of the input axis of the tor-con 2, a rotational speed detector 15 that detects a rotational speed Nt of the output axis of the tor-con 2, a vehicle speed detector 16 that detects the rotational speed of the output axis of the transmission 3, that is, the speed of the vehicle, a downshift switch 7 that instructs the transmission 3 to shift down from the 2nd speed to the 1st speed, a shift switch 8 that instructs the transmission 3 to select a maximum speed among the 1st to the 4th speeds, and a forward/reverse change-over switch 9 that instructs the transmission 3 to switch the forward/reverse movement of the vehicle.

Figure 4:
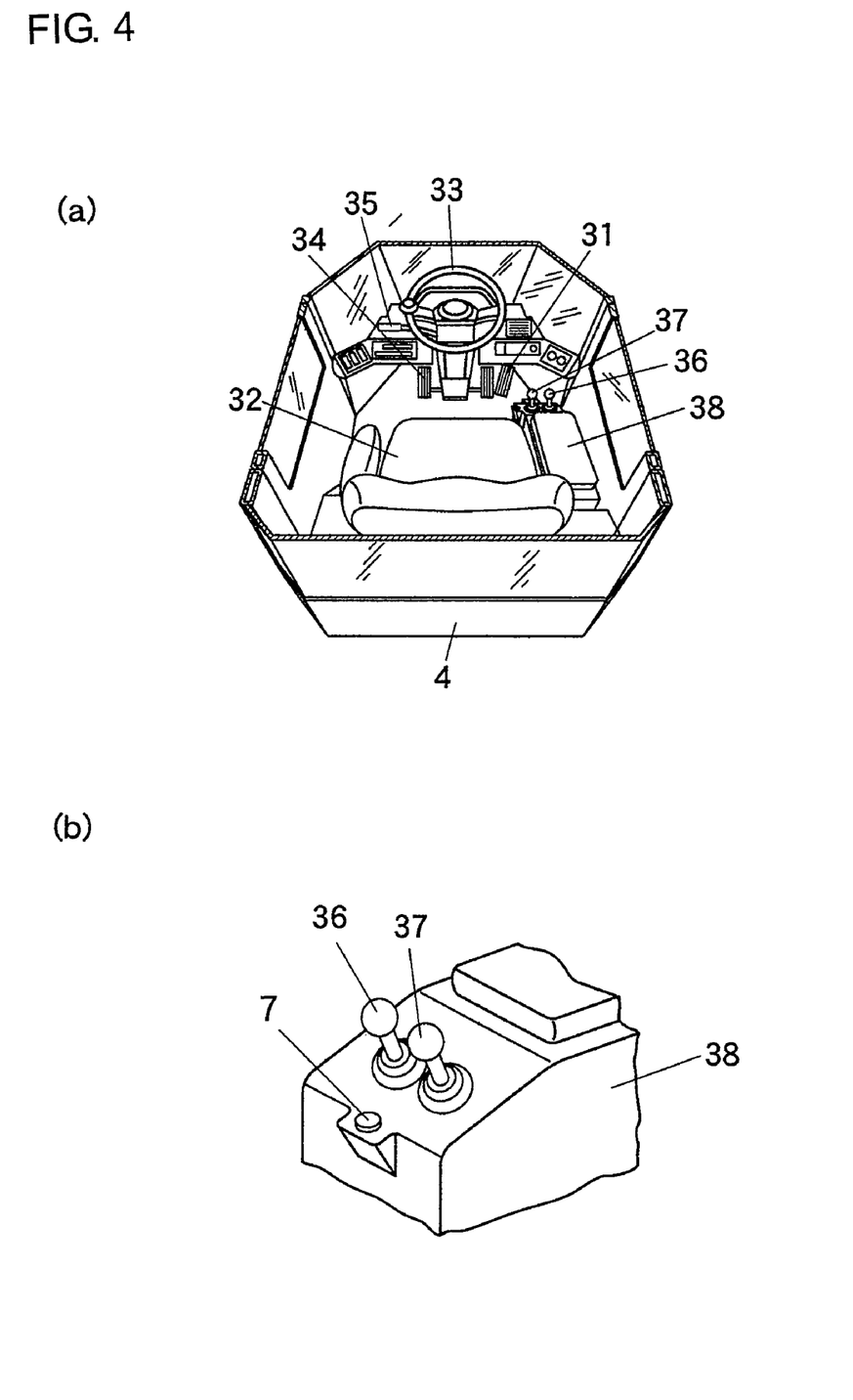
FIG. 4 is a main part perspective view showing an inside construction of a cab.

FIG. 4(*a*) is a main portion perspective view showing an inside construction of a cab 121. In the cab 121, there are provided a seat 32, steering wheel 33, an accelerator pedal 31, a brake pedal 34, a gearshift lever 35, and operation levers 36, 37, etc. The gearshift lever 35 is an operation member with which one of the 1st to the 4th speeds is selected; the shift switch 8 (see, FIG. 2) is operated with the gearshift lever 35. The operation levers 36, 37 are operation members for driving the arm cylinder 114 and the bucket cylinder 115, respectively, and driven by the cylinders 114, 115, respectively, according to the amounts of the lever operations.

As for operation levers 36, 37 are provided at the front of a console 38 on the right side of the seat as shown in FIG. 4(*b*). The operator can operate both the operation levers 36, 37 by the right hand while at the same time operating the steering wheel 33 by the left hand. A downshift switch 7 of the push button type (see, FIG. 2) is disposed in front of the operation levers 36, 37. This enables the operator to operate the downshift switch 7 while operating the operation levers 36, 37.

Figure 5:
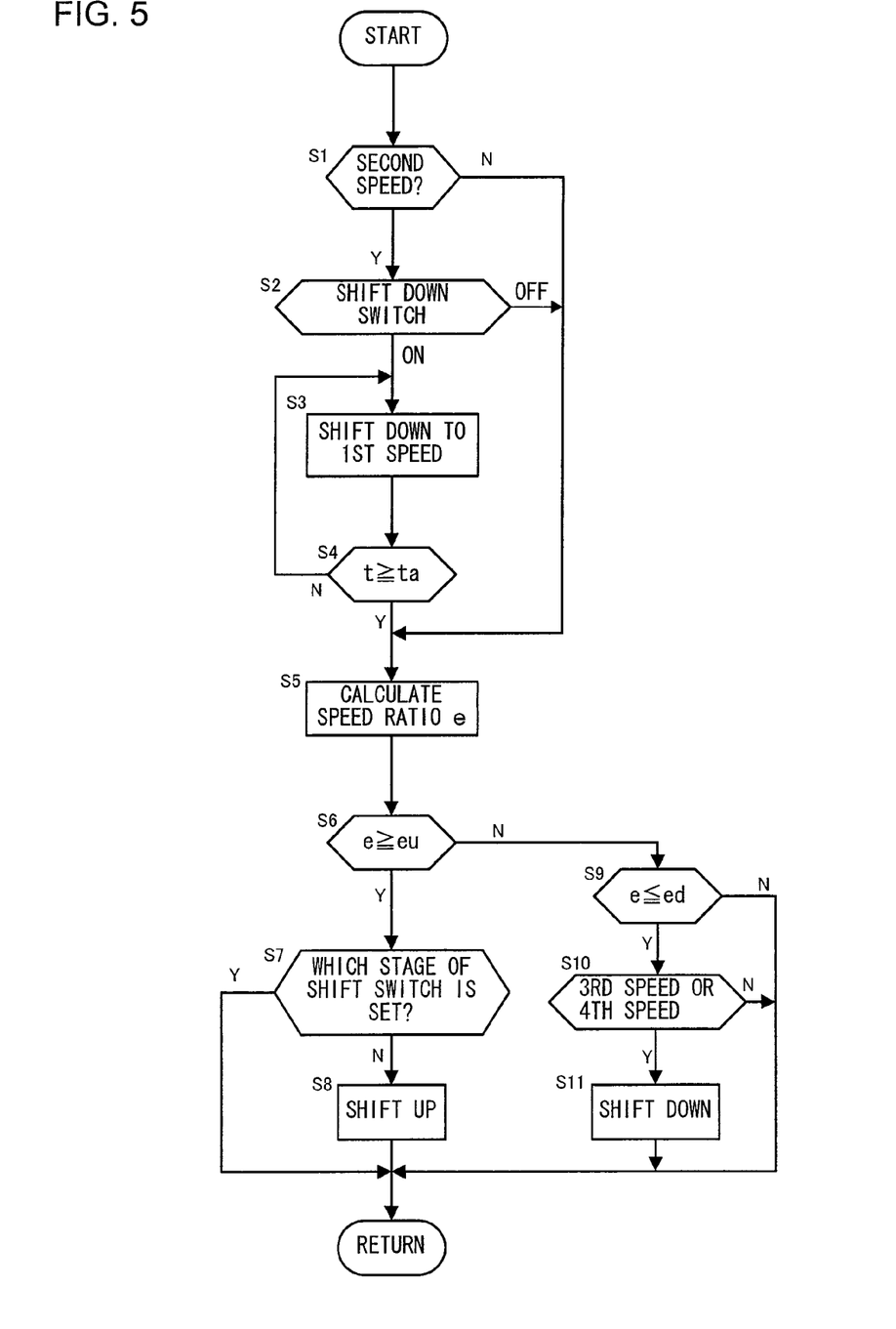
FIG. 5 is a flowchart for illustrating an example of gearshift processing in the controller shown in FIG. 2.

FIG. 5 is a flowchart for illustrating gearshift control processing in the controller 10. The controller 10 includes an input unit 10*a* that inputs various signals, an output unit 10*b* that outputs various control signals, a storage unit 10*c* such as a memory etc., and a calculation unit 10*d* such as a CPU.

The processing shown in FIG. 5 starts, for instance, by turning an engine key switch ON, and is executed by the calculation unit 10*d*. In step S1, it is determined whether the transmission 3 has been switched to the 2nd speed, that is, whether an instruction for the 2nd speed has been output from the controller 10 to the solenoid control unit 11. The process proceeds to step S2 when an affirmative answer is obtained in step S1 and to step S5 when a negative answer is obtained in step S1. In step S2, it is determined whether the downshift switch 7 has been operated. The process proceeds to step S3 when it is determined that the downshift switch 7 has been operated (ON). The process proceeds to step S5 when it is determined that the downshift switch 7 has not been operated (OFF).

In step S3, an instruction for the 1st speed is output from the output unit 10*b* to the solenoid control unit 11 to switch the speed stage to the 1st speed. At this time, a timer is started, and a time elapsed after the instruction for the 1st speed has been output is counted. In step S4, it is determined whether the time "t" is equal to or longer than a predetermined time period "ta" stored in the storage unit 10*c* beforehand. When NO is returned in step S4, the process returns to step S3 to repeat similar processing. As a result, the automatic gearshifting is prohibited for the predetermined time period "ta" after the operation of the downshift switch 7 and the speed stage of the vehicle is locked at the 1st speed. The predetermined time period "ta" is set, for instance, in consideration of a standard time required for the vehicle to rush to earth and sand after the speed stage is shifted down to the 1st speed upon excavation working, more particularly, to a time somewhat (for instance, about 1 to 2 seconds) longer than that standard time.

Figure 6:
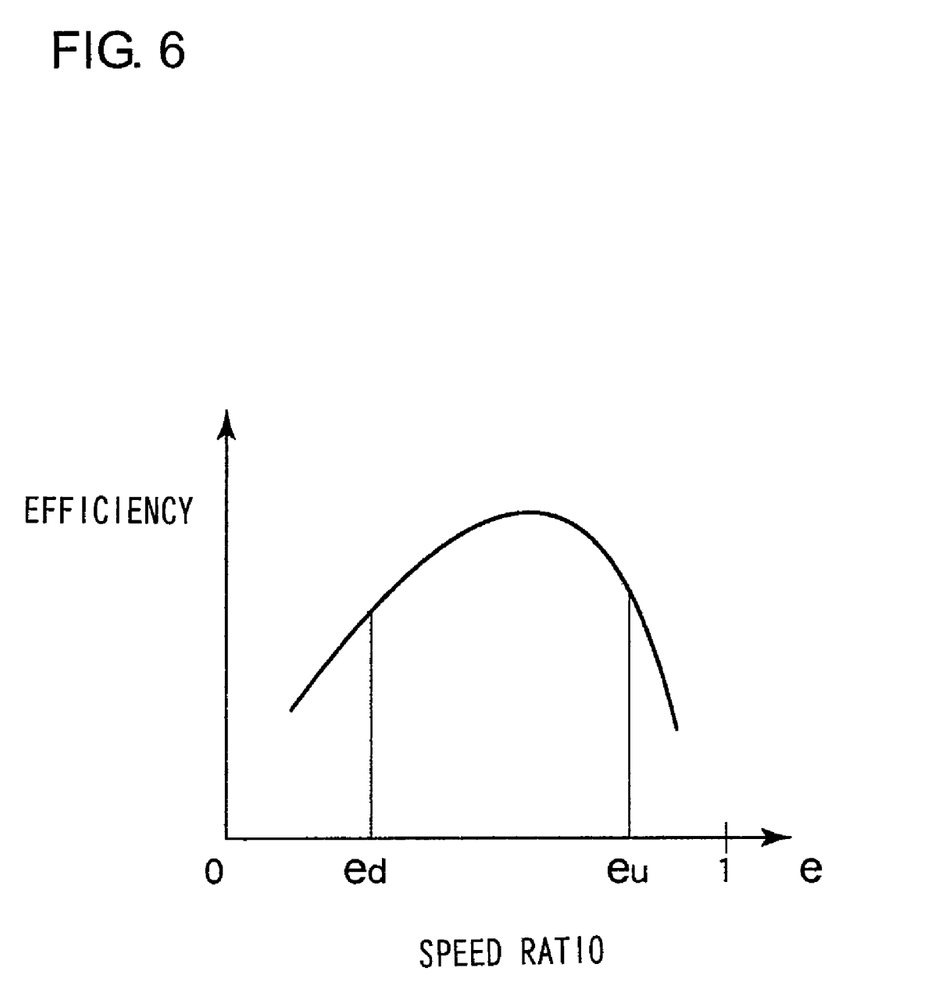
FIG. 6 is a diagram illustrating a relationship between the speed ratio of the tor-con and tor-con efficiency.

In step S5, the ratio of the rotational speed Ni of the input axis of tor-con 2 and the rotational speed Nt of the output axis of the tor-con 2, that is, the speed ratio "e" (=Nt/Ni) of the tor-con is calculated according to the signals from the rotational speed detectors 14, 15, respectively, input to the input unit 10*a*. In step S6, it is determined whether the speed ratio "e" of the tor-con is equal to or more than a predetermined value "eu" that has been set beforehand. There is a relationship, for instance, as shown in FIG. 6 between the tor-con speed ratio "e" and the efficiency of the tor-con 2. The predetermined value "eu" is an upper limit value of the speed ratio "e" of the tor-con upon gearshifting, which is set to a speed ratio (of, for instance, 0.8) that can maintain the tor-con efficiency equal to or more than a predetermined value.

The process proceeds to step S7 when an affirmation answer is obtained in step S6, and it is determined whether the present speed stage is a maximum speed stage set with the shift switch 8. The process is returned when YES is judged in step S7. The process proceeds to step S8 when a negative answer is obtained in step 7. In step S8, an upshift signal is output from the output unit 10*b* to the solenoid control unit 11. As a result, the transmission 3 shifts up by one stage.

Note that the predetermined values "eu", "ed" of the speed ratio "e" are set to a value of an intersection Px of a characteristic curve of the 1st speed stage and a characteristic curve of the 2nd speed stage in FIG. 3. Therefore, when the driving force decreases upon traveling at the 1st speed, and when the driving force reaches the intersection Px, there occurs an upshift to the 2nd speed. When the driving force increases upon traveling at the 2nd speed, and when the driving force reaches the intersection Px, there occurs a downshift to the 1st speed. As a result, the speed stage is smoothly changed from the 1st speed to the 2nd speed or from the 2nd speed to the 1st speed, and there is little gear shift shock. On this occasion, the speed ratio "e" is almost constant regardless of the engine rotational speed although the characteristic curves of each speed stage shifts leftward when the engine rotational speed lowers, and the intersection Px shifts in the direction of the arrow.

On the other hand, the process proceeds to step S9 when the tor-con speed ratio "e" is determined to be less than the predetermined value "eu" in step S6 and it is determined whether the speed ratio "e" of tor-con is equal to or less than a predetermined value "ed". The predetermined value "ed" is a lower limit value of the speed ratio "e" of the tor-con, which is set to a speed ratio (of, for instance, 0.3) that can maintain the tor-con efficiency equal to or more than a predetermined value as shown in FIG. 6. The process proceeds to step S10 when YES is obtained in step S9 and it is determined whether the transmission 3 has been switched to the 3rd speed or the 4th speed. The process proceeds to step S11 when the transmission 3 has been switched to the 3rd speed or the 4th speed whereas the process is returned when the transmission is switched to the 1st speed or the 2nd speed. In step S11, a downshift instruction is output from the output unit 10*b* to the solenoid control unit 11. As a result, the transmission 3 is shifted down by one stage from the 3rd speed to the 2nd speed or from the 4th speed to the 3rd speed.

Figure 7:
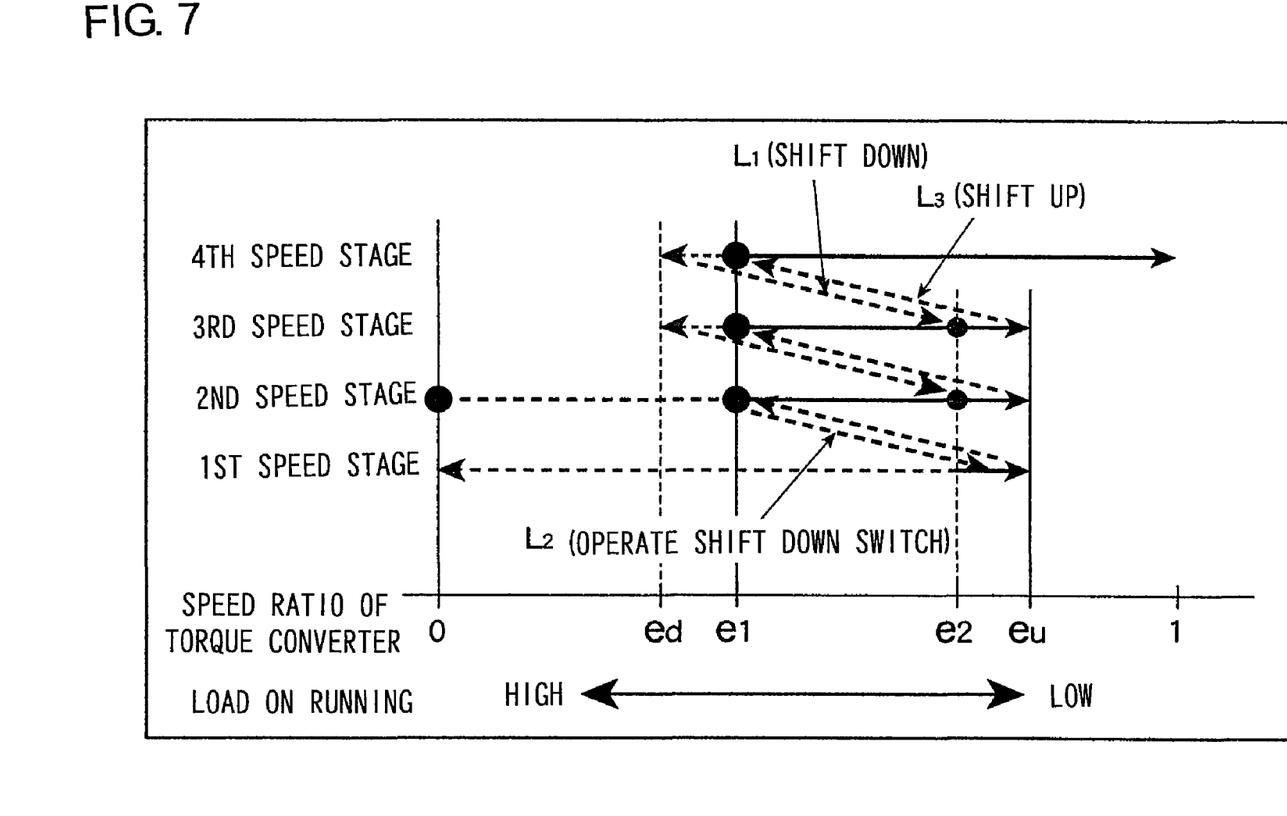
FIG. 7 is a diagram showing an example of operation of the gearshift controller according to one embodiment.

The speed stages of the transmission 3 change as shown in FIG. 7 by the above-mentioned processing in the controller 10. When the traveling load grows while the vehicle is traveling at, for instance, the 4th speed, and the speed ratio "e" of the tor-con decreases to the predetermined value "ed", the transmission 3 is shifted down to the 3rd speed as indicated by L1 in FIG. 1 (see, step S11). The rotational speed Nt of the output axis of the tor-con 2 increases immediately after this downshift so that a speed ratio "e2" increases (for instance, to about 0.7) to establish ed<e2<eu. When the speed ratio "e" of the tor-con is decreased to the predetermined value "ed" while the vehicle is traveling at the 3rd speed, the downshift occurs similarly to the above. In this case, the downshift is to the 2nd speed. There occurs no downshift while the vehicle is traveling at the 2nd speed, even if the speed ratio "e" of the tor-con is equal to or less than the predetermined value "ed", unless the downshift switch 7 is operated, and the minimum speed stage is the 2nd speed.

When the downshift switch 7 is operated while the vehicle is traveling at the 2nd speed, the transmission 3 is shifted down to the 1st speed as indicated by L2 in FIG. 2 (see, step S3). The state of the 1st speed is maintained for at least the predetermined time period "ta" regardless of the speed ratio "e" of the tor-con. If the speed ratio "e" of the tor-con after the predetermined time "ta" is equal to or more than the predetermined value "eu", the transmission 3 is shifted up to the 2nd speed (step S8). On the other hand, if the speed ratio "e" of the tor-con is less than the predetermined value "eu" after the predetermined time period "ta", the transmission 3 is not shifted up to the 2nd speed but remains at the 1st speed.

For instance, if the traveling load becomes smaller to increase the tor-con speed ratio "e" to the predetermined value "eu" while the vehicle is traveling at the 3rd speed, with the shift switch 8 being set at the 4th speed, then the transmission 3 is shifted up to the 4th speed as indicated by L3 in the FIG. 1 (see, step S8). The rotational speed Nt of the output axis of the tor-con 2 decreases immediately after this upshift to decrease the speed ratio "e1" (to, for instance, 0.4) to establish ed<e1<eu. The same will do when the speed ratio "e" of the tor-con has increased to the predetermined value "eu" while the vehicle is traveling at the 2nd speed. In this case, however, the upshift is to the 3rd speed.

When the shift switch 8 is set at any of the 1st speed to the 3rd speed, the transmission 3 will not be shifted up to exceed the set speed stage, so that the maximum speed stage is limited. For instance, when the shift switch 8 is set at the 3rd speed, the transmission 3 will not be shifted up to the 4th speed but remains in the state of the 3rd speed, even if the speed ratio "e" of the tor-con is equal to or more than the predetermined value "eu".

Figure 8:
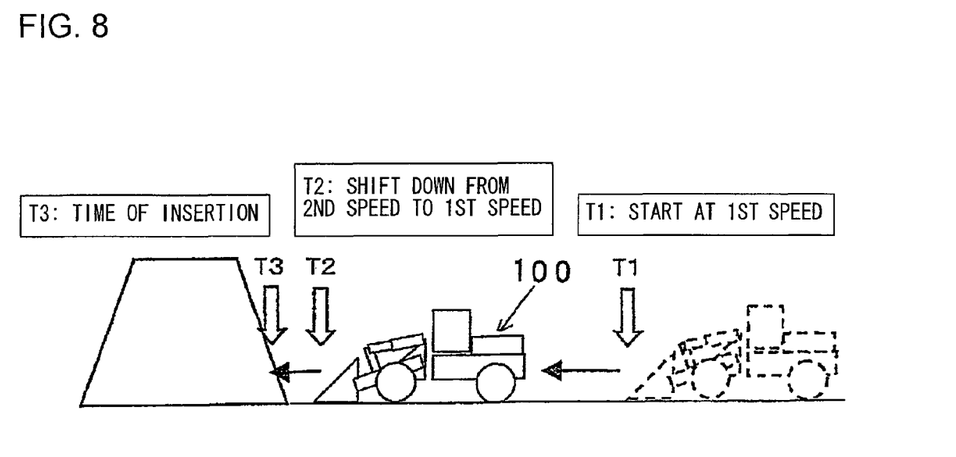
FIG. 8 is a diagram illustrating the operation upon excavation working.

Next, explanation is made on the action of the bucket 112 when it is rushed into piled earth and sand to achieve excavation work. The wheel loader 100 (vehicle) is started at a point in time T1 as shown in FIG. 8. The vehicle starts at the 2nd speed and advances toward the pile of earth and sand because the downshift switch 7 is not operated at the time of the starting. When the vehicle moves to come close to the earth and sand at a point in time T2, the operator operates the downshift switch 7. In this case, if the vehicle is traveling at the 3rd speed or higher, the downshift switch 7 is operated after the traveling mode of the vehicle is switched over to the 2nd speed traveling by operating the shift switch 8. As a result, the transmission 3 is switched over to the 1st speed during the predetermined time period "ta".

Thereafter, the bucket 112 is rushed into the pile of earth and sand at a point in time T3. On this occasion, the bucket 112 can rush into the pile of earth and sand in the sate of the 1st speed and a big driving force can be obtained incase of T3−T2<Ta. Therefore, the earth and sand can be taken easily into the bucket, and the work efficiency is improved. Moreover, because the vehicle speed is decreased by assuming the state of the 1st speed, the shock when the bucket rushed thereinto can be decreased.

After the bucket has rushed thereinto, the speed ratio of the tor-con is e<eu because a heavy load acts on the vehicle. Therefore, the state of the 1st speed is maintained, even if the predetermined time period to has passed, since the bucket 112 rushed thereinto. Thus, a big driving force can be demonstrated. When the earth and sand is taken in the bucket 112 and the vehicle is retreated, the load that acts on the vehicle decreases. On this occasion, when the speed ratio "e" of the tor-con reaches "eu", the vehicle automatically undergoes an upshift of the gear. As a result, the vehicle never travels at the 1st speed more than is necessary, so that fuel consumption is improved and the noise can be decreased. Note that in excavation works such as sand excavation that does not need so big a driving force, the user occasionally works with the transmission maintained at the 2nd speed.

The following advantages can be achieved in the embodiment described above.

(1) Since the speed stage is switched to the 1st speed for only the predetermined time period ta by the operation of the downshift switch 7, no undesirable shift up occurs when the vehicle rushes into the pile of the earth and sand, etc., so that there can be obtained an enough driving force.

(2) If the downshift switch 7 is operated once, it need not be operated anymore after that, which makes it unnecessary to perform a complex operation. On the contrary, for instance, in the arrangement in which simply the downshift to the 1st speed is achieved by the operation of the downshift switch, even if the downshift switch is once operated immediately before the vehicle rushes to the earth and sand, an upshift to the 2nd speed occurs soon. Accordingly, the downshift switch need be operated repeatedly and operation for gearshifting is complicated.

(3) Since the downshift switch 7 is disposed near the operation levers 36, 37, the downshift switch 7 can be easily operated while operating the operation levers 36, 37.

(4) After the predetermined time period ta has passed, an upshift occurs automatically when the load is light because the maximum speed stage need not be limited to the 1st speed by operating the shift switch 8 upon working. Therefore, it can be avoided to assume the state of the 1st speed any longer than is necessary.

(5) Since the switch to the 1st speed by the operation of the downshift switch 7 is permitted when the vehicle is traveling at the 2nd speed, the gearshift shock is small.

(6) Since the minimum speed stage is limited to the 2nd speed unless the downshift switch 7 is operated and the gearshift is allowed to occur in the range of the 2nd speed to the 4th speed, the vehicle starts at the 2nd speed in regular traveling. This reduces the shock at the time of starting of the vehicle.

(7) Since the maximum speed stage is controlled through the shift switch 8, works can be achieved with a reduced number of times of gearshifting.

(8) The tor-con efficiency is equal to or more than a predetermined value and fuel consumption is improved because an upshift occurs at the tor-con speed ratio "e" equal to or more than the predetermined value "eu" and a downshift occurs at the speed ratio "e" of the tor-con equal to or less than the predetermined value "ed".

In the above-mentioned embodiment, the downshift to the 1st speed occurs for only a predetermined time period ta when the downshift switch 7 is operated. However, the predetermined time period ta may be made variable. For instance, there may be provided a mode switch through which the predetermined time period ta is changed based on a selected mode selected with the mode switch. When the vehicle is traveling in the 2nd speed, the operation of the downshift switch 7 is enabled. However, the operation of the downshift switch 7 may be enabled while the vehicle is traveling on the 3rd speed or the 4th speed. For instance, the speed stage may be shifted down immediately when the downshift switch 7 is operated while the vehicle is traveling on the 3rd speed. Alternatively, every time when the downshift switch 7 is operated, the speed stage may be shifted down by one stage as in the case of the 3rd speed→the 2nd speed, the 2nd speed→the 1st speed.

The speed stage is shifted down with limits of no lower than the 2nd speed when the speed ratio "e" of the tor-con is equal to or less than the predetermined value "ed". However, the speed stage may be shifted down to the 1st speed. This enables the vehicle to travel at the 1st speed automatically when the load is heavy. When the downshift switch 7 is operated while the vehicle is traveling on the 1st speed, the state of the 1st speed may be maintained for only the predetermined time period ta counting from that time. Note that the predetermined time period ta may be measured by an analog-type signal circuit.

When the speed ratio "e" of the tor-con is equal to or more than the predetermined value "eu" (the 1st predetermined value) or equal to or less than the predetermined value "ed" (the 2nd predetermined value), a control signal is output from the controller 10 to the solenoid control unit 11 to effect automatic gearshift. However, the configuration of the gearshift control unit may be other than the above mentioned one. That is, the gearshift control unit may be of any type so far as the speed stage is shifted down to the 1st speed for the predetermined time period to regardless of the tor-con speed ratio "e" by the operation of the downshift switch 7.

Although the downshift switch is provided in the vicinity of the operation levers 36, 37, which are operation members for working, the operation members themselves may be provided with the downshift switch 7. Although the downshift to the 1st speed is instructed by operating the downshift switch 7, the downshift may be instructed through other operation members The tor-con speed ratio "e" is detected according to signals from the rotational speed detectors 14, 15. However, the speed ratio detector may be of any type. The maximum speed stage is set by operating the shift switch 8 through the gearshift lever 35. However, the speed stage setting unit is not limited thereto. The rotational speed Ni of the input axis of the tor-con 2 is detected by the rotational speed detector 14, and the rotational speed Nt of the output axis of the tor-con 2 is detected by the rotational speed detector 15. However, the configuration of the rotational speed detecting unit is not limited thereto.

In the above embodiment, explanation has been made on the example in which the present invention is applied to the gearshift controller for a wheel loader. However, the present invention is also applicable to gearshift controllers for other industrial vehicles such as wheel shovels and fork lifts. Namely, as long as the features and functions of the present invention are realized, the gearshift controller according to the present invention is not limited to the examples presented in the above-mentioned embodiments.

This application is based on Japanese Patent Application No. 2006-323029 (filed on Nov. 30, 2006), and the content thereof is incorporated herein by reference.

The invention claimed is:

1. A gearshift controller for an industrial vehicle, comprising:
   a speed ratio detection unit that detects a speed ratio of speed of an input axis and of an output axis of a torque converter;
   a gearshift control unit that shifts up a speed stage when the detected speed ratio is equal to or more than a first predetermined value and shifts down the speed stage when the detected speed ratio is equal to or less than a second predetermined value, which is smaller than the first predetermined value; and
   an operation member with which a downshift to the first speed is instructed by operation thereof by an operator, wherein
   when the downshift is instructed by the operation member, the gearshift control unit controls the speed stage to be kept at the first speed for a predetermined time period regardless of the speed ratio detected by the speed ratio detection unit, and
   the gearshift control unit allows switching to the first speed by operation of the operation member while the vehicle is traveling at a second speed and prohibits the switching to the first speed by operation of the operation member while the vehicle is traveling at a third or higher speed.

2. A gearshift controller for an industrial vehicle according to claim 1, wherein
   when the downshift is not instructed with the operation member, the gearshift control unit controls a minimum speed stage while the vehicle is traveling to be kept at a second speed.

3. A gearshift controller for an industrial vehicle according to claim 1, further comprising:
   a speed stage setting unit that sets a maximum speed stage of the transmission with operation by the operator and wherein
   the gearshift control unit limits the speed stage equal to or lower than the set maximum speed stage upon the upshift.

4. A gearshift controller for an industrial vehicle according to claim 1, wherein
   the operation member is disposed to an operation member for working that operates an actuator for working or in the vicinity of the operation member for working.

5. An industrial vehicle comprising:
   four tires;
   a body comprising a front side frame and a rear side frame articulately connected to each other, the body being supported by the tires;
   a cab provided in front of the rear side frame;
   an engine compartment provided in rear of the rear side frame;
   an arm provided rotatably in a vertical direction with respect to the front side frame;
   a bucket provided rotatably at a top of the arm; and
   a gearshift controller according to claim 1.

6. A gearshift controller for an industrial vehicle, comprising:
   a rotational speed detection unit that detects respective rotational speeds of an input axis and of an output axis of a torque converter;
   a solenoid control unit that drives a solenoid for gearshift of a transmission;
   a gearshift control unit having an input unit that inputs signals detected by the rotational speed detection unit and a calculation unit that calculates a speed ratio of rotational speeds of the input axis and of the output axis based on the signals input by the input unit, the gearshift control unit shifting up a speed stage when the calculated ratio of speeds is equal to or more than a first predetermined value and shifting down the speed stage when the calculated ratio of speeds is equal to or less than a second predetermined value, which is smaller than the first predetermined value; and
   an operation member with which a downshift to the first speed is instructed by operation thereof by an operator, wherein
   the gearshift control unit further includes
   a memory unit in which there is set a predetermined time period longer than a standard time period required for the vehicle to thrust into earth and sand after the downshift of the speed stage to the first stage upon excavation; and
   an output unit that outputs a control signal to the solenoid control unit so as to control the speed stage to be maintained at the first speed for the predetermined time period regardless of the calculated ratio of speeds when the downshift of the speed stage to the first speed is instructed with the operation member, wherein
   the gearshift control unit allows switching to the first speed by operation of the operation member while the vehicle is traveling at a second speed and prohibits the switching to the first speed by operation of the operation member while the vehicle is traveling at a third or higher speed.

* * * * *